(12) United States Patent
Haines

(10) Patent No.: US 6,347,511 B1
(45) Date of Patent: Feb. 19, 2002

(54) EXHAUST GAS PURIFICATION SYSTEM FOR LEAN BURN ENGINE

(75) Inventor: Leland Milburn Haines, Northville, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 46 days.

(21) Appl. No.: 09/469,040

(22) Filed: Dec. 21, 1999

(51) Int. Cl.[7] .................................................. F01N 3/00
(52) U.S. Cl. ............................ 60/274; 60/284; 60/287; 60/298; 60/300; 422/169; 422/173
(58) Field of Search .......................... 60/286, 287, 288, 60/295, 298, 300, 274, 284; 422/169, 170, 171, 172, 173, 174, 175

(56) References Cited

U.S. PATENT DOCUMENTS

| | | | |
|---|---|---|---|
| 4,023,360 A | | 5/1977 | Wössner et al. |
| 5,033,264 A | * | 7/1991 | Cabral .......................... 60/298 |
| 5,105,619 A | | 4/1992 | Arai |
| 5,130,099 A | | 7/1992 | Schatz |
| 5,195,318 A | | 3/1993 | Shinzawa et al. |
| 5,397,545 A | * | 3/1995 | Balling et al. ............... 422/171 |
| 5,474,745 A | * | 12/1995 | Fukui et al. ................. 422/171 |
| 5,489,319 A | | 2/1996 | Tokuda et al. |
| 5,512,251 A | * | 4/1996 | Brunson et al. ............. 422/174 |
| 5,571,485 A | * | 11/1996 | Brunson ....................... 422/174 |
| 5,603,215 A | * | 2/1997 | Sung et al. .................... 60/298 |
| 5,613,359 A | | 3/1997 | Zahn et al. |
| 5,766,559 A | * | 6/1998 | Blanchet et al. ............. 422/171 |
| 5,874,051 A | * | 2/1999 | Heil et al. .................... 422/171 |
| 5,888,456 A | * | 3/1999 | Hashimoto et al. ........... 60/300 |
| 5,916,129 A | * | 6/1999 | Modica et al. ................. 60/274 |
| 5,987,885 A | * | 11/1999 | Kizer et al. .................... 60/298 |
| 6,009,703 A | * | 1/2000 | Bouchez et al. ............... 60/287 |
| 6,018,943 A | * | 2/2000 | Martin et al. .................. 60/287 |
| 6,029,443 A | * | 2/2000 | Hirota et al. .................. 60/298 |
| 6,235,254 B1 | * | 5/2001 | Murphy et al. ................ 60/274 |

* cited by examiner

Primary Examiner—Thomas Denion
Assistant Examiner—Tu M. Nguyen
(74) Attorney, Agent, or Firm—Jerome R. Drouillard

(57) ABSTRACT

An exhaust gas purification system for a lean burn engine includes a thermal mass unit and a $NO_x$ conversion catalyst unit downstream of the thermal mass unit. The $NO_x$ conversion catalyst unit includes at least one catalyst section. Each catalyst section includes a catalytic layer for converting $NO_x$ coupled to a heat exchanger. The heat exchanger portion of the catalyst section acts to maintain the catalytic layer substantially at a desired temperature and cools the exhaust gas flowing from the catalytic layer into the next catalytic section in the series. In a further aspect of the invention, the exhaust gas purification system includes a dual length exhaust pipe upstream of the $NO_x$ conversion catalyst unit. The dual length exhaust pipe includes a second heat exchanger which functions to maintain the temperature of the exhaust gas flowing into the thermal mass downstream near a desired average temperature.

19 Claims, 3 Drawing Sheets

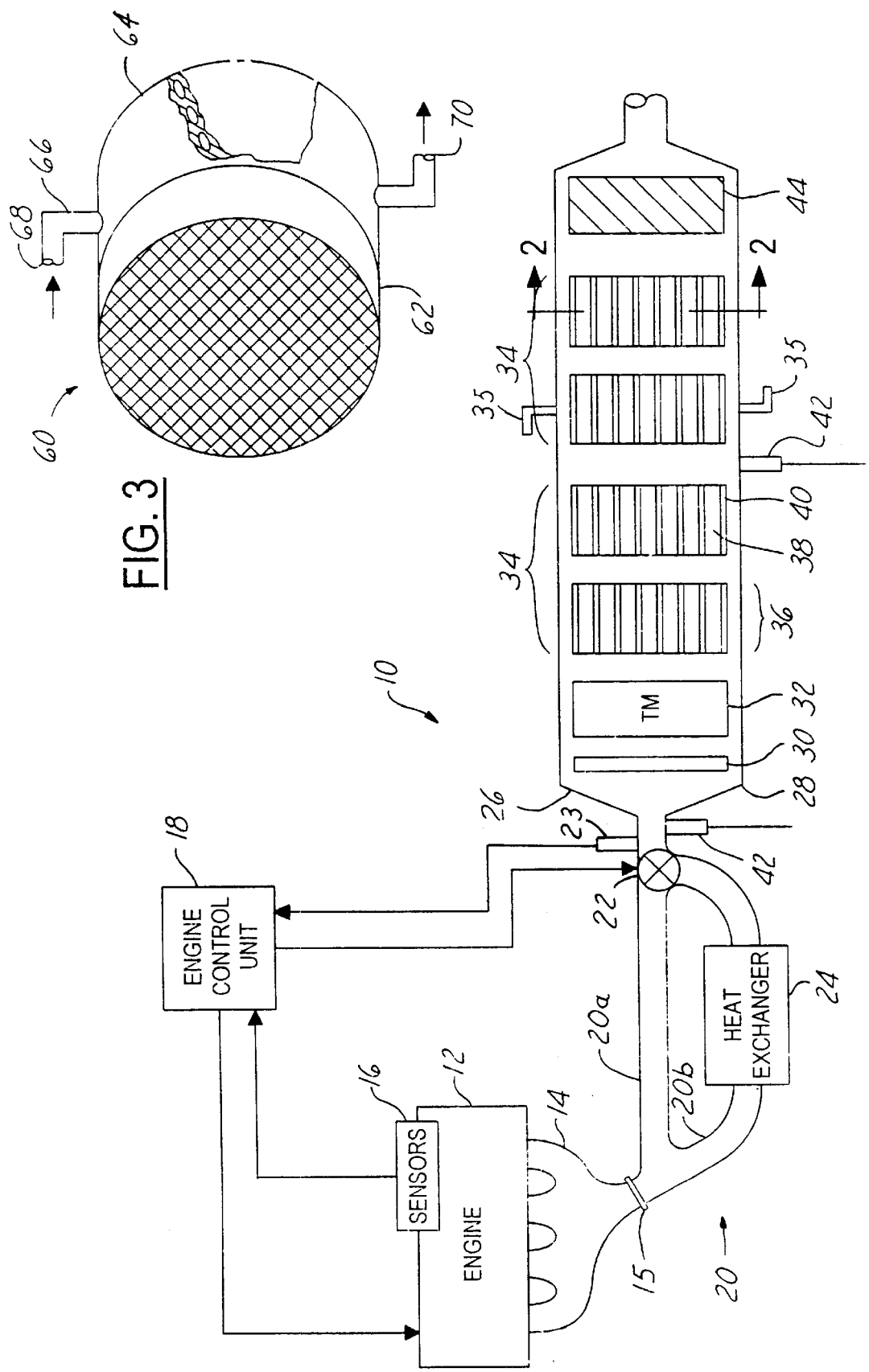

EXHAUST GAS PURIFICATION SYSTEM FOR LEAN BURN ENGINE

This invention was made with Government support under NREL Subcontract No. ZCB-4-13032-02, Prime Contract No. DE-AC36-83CH10093 awarded by the Department of Energy. The Government has certain rights in this invention.

FIELD OF THE INVENTION

The present invention relates generally to exhaust systems for engines and, more particularly, to an exhaust after-treatment system for a low emission, lean-burn internal combustion engine.

BACKGROUND OF THE INVENTION

Catalysts are generally used as a means for removing pollutants such as HC, CO, and $NO_x$ from the exhaust gas of internal combustion engines. The ability of a catalyst to remove $NO_x$ in the exhaust gas falls rapidly, however, when the air-fuel ratio of the exhaust gas becomes leaner. Therefore, in engines operating in a lean air-fuel ratio environment, such as stratified charge lean-burn engine, it is difficult to remove $NO_x$ from the exhaust gas using a conventional catalyst. Similarly, in the case of diesel engines, a reductant is required to reduce $NO_x$ since the exhaust gas has a relatively high concentration of oxygen.

Accordingly, to achieve $NO_x$ control, exhaust after-treatment systems have included a $NO_x$ conversion device. Presently, however, the performance of $NO_x$ conversion technology is limited in several respects. $NO_x$ conversion efficiency is affected by the operating temperature of the device, and requires a relatively narrow temperature operating window. In particular, the HC reductant used in diesel engine systems results in a highly exothermic reaction that heats the catalyst. As the catalyst and exhaust gas temperature increases, the HC reductant tends to react more readily with the oxygen than the $NO_x$, thereby reducing the $NO_x$ conversion efficiency.

Accordingly, there is a need to maintain the temperature of the exhaust gas within a narrow range such that the HC reductant is more selective towards $NO_x$ reduction.

In addition, because the efficiency of catalysts and $NO_x$ conversion devices are temperature dependent, a significant portion of harmful emissions can be generated during the cold start portion of the engine cycle, i.e., the first 100–200 seconds after cold start. Thus, there exists a need for an exhaust after-treatment system which provides an effective means of reducing cold start $NO_x$ emissions as well.

SUMMARY OF THE INVENTION

One object of the present invention is to provide an improved exhaust gas purification system.

The foregoing and other objects and advantages are achieved through the provision of an exhaust gas purification system for a lean-burn engine comprising a thermal mass unit and a $NO_x$ conversion catalyst unit downstream of the thermal mass unit. The $NO_x$ conversion catalyst unit includes one or more serially arranged catalyst sections which each include a catalytic layer for converting $NO_x$ coupled to a heat exchanger. The heat exchanger portion of the catalyst section acts to maintain the catalytic layer substantially at a desired temperature and transfer exothermic heat from the reacting HC reductant of the exhaust gas flowing through the catalytic layer. In one aspect of the invention, each of the several serially arranged catalyst sections are spaced apart from each other within the $NO_x$ conversion catalyst unit. This acts to increase the gas turbulence entering each catalyst section thereby increasing $NO_x$ conversion efficiency.

In a further aspect of the invention, at least two $NO_x$ conversion catalyst units are serially arranged downstream of the thermal mass unit. These additional units can be added as long as there are significant hydrocarbons passed through to the following unit. In such a case, the first $NO_x$ conversion catalyst unit obtains a higher $NO_x$ conversion efficiency than can be attained with a single $NO_x$ conversion catalyst unit.

In a further aspect of the invention, the exhaust gas purification system includes a dual length exhaust pipe including a first path and a second path for. cooling the exhaust gas, and an exhaust valve positioned within the exhaust pipe. The second path can include another heat exchange unit for transferring heat from the exhaust gas flowing through the second path. The exhaust valve controls the mixing of the exhaust flow through the first and second paths to maintain the temperature entering the thermal mass downstream near a desired average temperature.

In another aspect of the invention, a heater is included upstream of the $NO_x$ conversion catalyst unit to improve the light-off time of the $NO_x$ conversion catalyst unit during engine cold-start.

One advantage of the present invention is that it improves $NO_x$ conversion efficiency under transient or steady-state engine operation due to the controlled exhaust gas inlet temperature to the catalysts. Another advantage is that, as compared to conventional catalyst systems, the higher $NO_x$ conversion efficiency level results in less HC reductant being used for a given $NO_x$ emission reduction level. A further feature of the invention is improved reductions in HC and $NO_x$ generated during engine cold start. This results from both the heater and the fact that the catalyst can be located closer to the engine because of the dual length exhaust pipe and heat exchanger.

Other features and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 1 is a schematic view of an exhaust system according to one embodiment of the present invention illustrating its operational relationship with an internal combustion engine.

FIG. 3 is an isometric view of another embodiment of the catalyst section unit of FIG. 1.

DESCRIPTION OF THE PREFERRED EMBODIMENTS

Figure 2A:
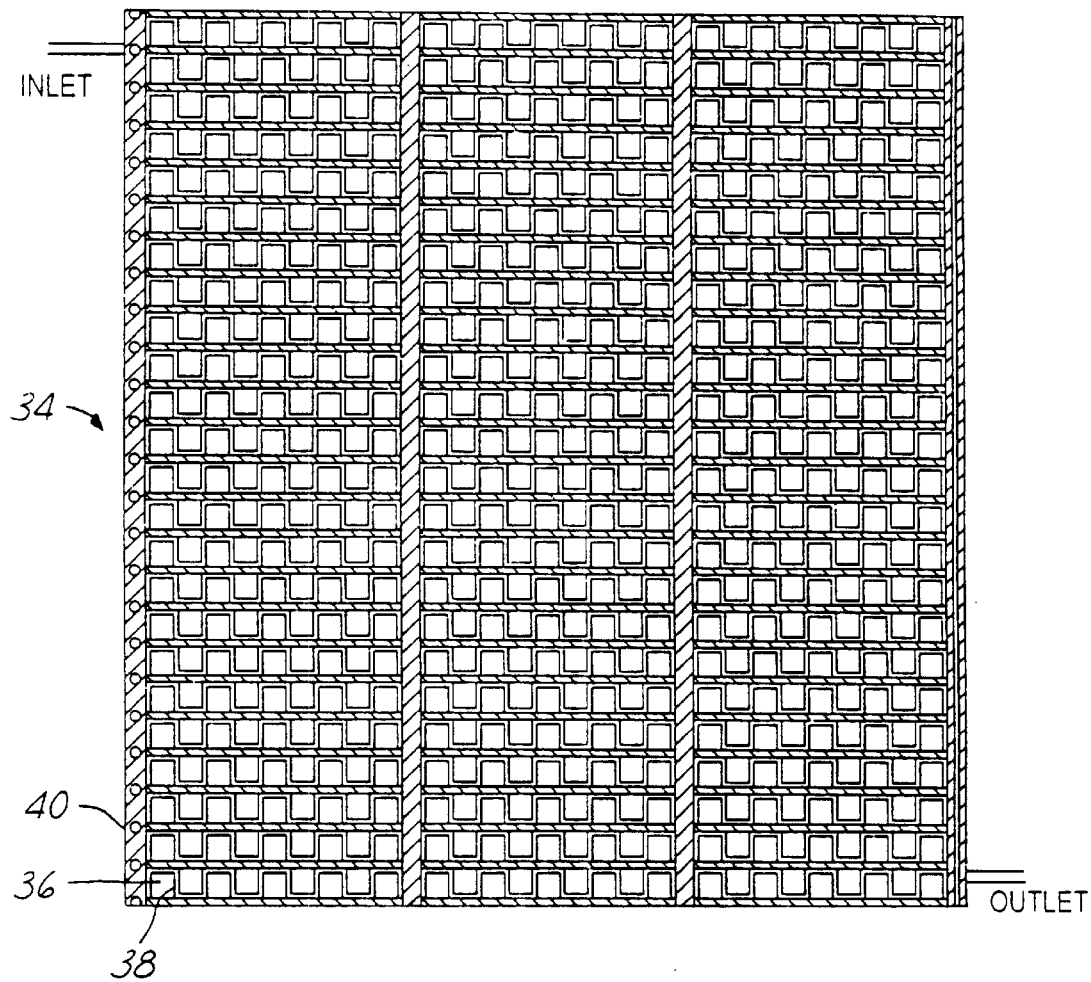
FIGS. 2A and 2B are a cross-sectional view of one embodiment of the catalyst section unit of FIG. 1 along line 2—2.

Turning now to FIG. 1, an exhaust gas purification system 10 is illustrated in operational relationship with a lean burn internal combustion engine 12 such as a direct injected diesel engine for an automotive vehicle. The engine 12 has an exhaust manifold 14 to direct the exhaust gases from the engine 12 to the exhaust system 10.

The engine 12 includes sensors, indicated generally at 16, for providing information about engine performance to the engine control unit 18. Such information includes the crankshaft position, angular velocity, throttle position, air temperature, engine coolant temperature, etc. The information from the sensors 16 is used by the engine control unit 18 to control operation of the engine 12.

The exhaust gas purification system 10 is coupled to the exhaust manifold 14 by way of an exhaust flange 15 and includes a dual length exhaust pipe 20 which provides a first path 20A and a second path 20B for exhaust gas flow. The dual length exhaust pipe 20 further includes an exhaust valve 22 which is controlled by the engine control unit 18 via a downstream exhaust gas temperature sensor 23 to regulate the flow of exhaust gas through the first and second paths, 20A and 20B. The second exhaust path 20B is preferably longer than the first exhaust path 20A to provide additional cooling to the exhaust gas flowing through the second exhaust path 20B. In addition, the second exhaust path 20B also preferably includes a heat exchanger 24. The heat exchanger 24 further lowers the bypassed exhaust gas temperature. In low temperature environments, however, the heat exchanger 24 may also aid to increase the exhaust gas temperature. The exhaust valve 22 controls the mixing of the bypassed exhaust flow through the second path 20B with the engine-out exhaust flow through the first path 20A to maintain the temperature entering the catalyst system near a desired overall average.

One advantage of the dual length exhaust pipe 20 is that it allows the catalyst system to be more closely coupled to the engine 12, thereby providing faster light-off of the catalyst.

The dual length exhaust pipe 20 transports exhaust gas produced from combustion of an air/fuel mixture in the engine 12 to the catalyst system 26. The catalyst system 26 is contained within one or more housings 28. The catalyst system 26 preferably includes a heater 30 to increase the exhaust gas temperature entering the catalyst system during engine-cold start. This is done to further improve the light-off time within the catalyst and may also be designed to burn some or all of the hydrocarbons in the exhaust gas flow during the light-off phase. It can be used to raise the exhaust gas temperature under light load conditions and/or under cold environment conditions. The heater 30 may be made of a catalyst-coated, electrically heated ceramic substrate, such that the catalyst is formulated to light-off HC above the normal exhaust gas temperature operating range.

A thermal mass unit 32 acts to dampen the temperature fluctuations of the exhaust gas entering the catalyst system during transient speed and load engine conditions. The thermal mass unit 32 can take many forms such as a heat exchanger, however, it is important that its thermal inertia be such that the exiting exhaust gas flow under relatively large changes in speed and load have a substantially steady-state temperature.

The thermal mass unit 32 can be constructed of a ceramic or metal honeycomb structure, or constructed similar to an automotive radiator. For efficiency, the heater 30 and thermal mass unit 32 would, preferably be combined together in a single unit.

Exhaust gas purification system 10 of FIG. 1 includes two $NO_x$ conversion catalyst units 34. Each $NO_x$ conversion catalyst unit 34 includes at least one catalyst section 36 which includes a catalytic layer 38 coupled to a heat exchanger 40. The catalyst sections 36 are arranged serially in the housing 28 in a spaced apart relationship. This space increases the gas turbulence entering the catalyst section 36 thereby increasing the $NO_x$ conversion efficiency of the catalyst layer 38. Flow vanes (not shown) may also be used in this area to improve the temperature uniformity of the exhaust gas flowing into the catalyst section 36.

The catalytic layer 38 is composed of the catalytic component such as platinum, palladium, rhodium and transition metals combined therewith carried on a substrate having a washcoat to increase its surface area. The substrate is preferably formed into a honeycomb structure made of a good heat conducting material such as metal. This aids in the exothermic heat transfer to the heat exchanger plate 40.

In the $NO_x$ purification process of the present invention, a reductant such as diesel fuel or HC is reacted with the $NO_x$ to be purified in the catalytic layer 38. The reductant may be from a late post injection in the cylinder, and contained in the exhaust gas flowing through the system, or added to the exhaust gas such as shown in FIG. 1 through reductant injectors 42. The reductant injectors 42 are located in relation to the catalyst inlet so as to distribute the reductant across the front of the catalyst substrate.

Preferably, the catalytic layer 38 loading matched to the amount of hydrocarbons burning within it and corresponding substrate heat—exchanger heat transfer capacity, thereby keeping the exhaust gas temperature flowing across the active catalyst sites within the desired temperature range to improve HC—$NO_x$ selectivity. In other words, in lean-burn engines such as the diesel engine of FIG. 1, there exist excess amounts of $O_2$ in the exhaust gas, and the $O_2$ concentration is substantially higher than the $NO_x$ concentration. Increasing the catalyst-exhaust gas temperature tends to facilitate oxidation between $O_2$ and the reductant rather than the reductant and $NO_x$. This is a result of the increase in exothermic heat resulting from the oxidation process which tends to increase the catalytic temperature and decrease the reductant $NO_x$ selectivity. By reducing the length of the catalytic layer 38, it reduces the amount of reductant burning within it, thereby inhibiting the generation of exothermic heat. In addition, since the catalytic layer 38 does not burn all the reductant passing through it, some of the reductant is available to reduce the $NO_x$ in the following catalyst section 36. Accordingly, the number of catalyst sections 36 within each $NO_x$ conversion catalyst unit 34 may be more than the two shown, and may be repeated as long as there is a significant amount of reductant passed through to the following unit. It has been found that higher $NO_x$ conversion efficiencies are obtained with multiple catalyst sections than those obtained with a single catalyst section. Similarly, even higher $NO_x$ conversion rates may be obtained by the use of multiple $NO_x$ conversion catalyst units depending upon the level of $NO_x$ conversion desired.

The heat exchanger 40 can comprise an air-to-air, air-to-coolant, cross-flow, or heat-pipe type heat exchanger. The heat exchanger preferably includes fluid-flow conduits 35 to aid in the heat transfer. The structure of the heat exchanger 40 will be described in further detail below with reference to FIGS. 2A and 2B. Alternatively, the heat exchanger can be formed in a finned design with controlled external forced air cooling or fluid cooling. In such a case, the heat exchanger would include a heat-pipe transfer to air as liquid-cooled fins. Preferably, the thermal inertia of the heat exchanger 40 is optimized to reduce temperature variations of the exhaust gas entering the subsequent catalytic layer during transient engine operating conditions. In addition, the heat exchanger 40 operates to maintain the bed temperature of the catalytic layer to which it is coupled within its optimized temperature range for $NO_x$ conversion efficiency.

To further control the temperature of each catalyst section 36, it is desirable to use a washcoat for the catalytic layer having reduced insulation properties (i.e., a higher heat transfer coefficient) to increase the heat transfer from the catalyst component to the substrate to further reduce localized high temperature regions within the catalytic layer 38.

An additional oxidation catalyst or three-way catalyst 44 may also be included downstream of the $NO_x$ conversion catalyst units 34 to further purify HC, CO and the like in the exhaust gas.

In operation, a flow of exhaust gas from the engine 12 is regulated by the engine control unit 18 via the exhaust valve 22 through the first exhaust path 20A and second exhaust path 20B to regulate the temperature of the exhaust gas flowing into the catalyst system 26. Control logic within the engine control unit 18 monitors the temperature of the exhaust gas flowing through the first path 20A, second path 20B, as well as the heat exchanger 24 and controls the exhaust valve 22 by known methods to maintain the exhaust gas temperature entering the catalyst system within a desired overall average range. One example of such a control system is disclosed in U.S. Pat. No. 5,855,113 assigned to Ford Global Technologies, Inc. which is herein incorporated by reference.

If the engine is operating in a cold start mode, the heater 30 is activated to burn HC on its catalyst-cooled surface to increase the temperature of the exhaust gas flowing into the $NO_x$ conversion catalyst unit 34 to improve the light-off time within the catalyst. As soon as HC light-off occurs within the catalyst, electricity to the heater 30 is cut off, and HC burning occurs only in the catalyst 38. Reductant injection, such as HC or diesel fuel, can also occur upstream of the $NO_x$ conversion catalyst unit 34 to rapidly light-off the catalyst. If the heater 30 is located downstream of the reductant nozzle 42, it may also be used to burn off some or all of the HC during the light-off phase.

The exhaust gas then flows through the thermal mass unit 32 which aids in maintaining the temperature of the exhaust gas flow and damping fluctuations in the exhaust gas temperature passed to the $NO_x$ conversion catalyst units 34. The exhaust then flows into the catalyst section 36 and, in particular, through the catalytic layer 38 wherein the $NO_x$ conversion takes place. At the same time, the heat exchanger 40 maintains the catalytic layer 38 within a desired temperature range for optimum $NO_x$ conversion efficiency. Any remaining HC, CO or $NO_x$ is converted by the catalytic converter 44 downstream of the $NO_x$ conversion catalyst units 34. The exhaust gas then flows out of the catalyst system 26 to the tailpipe (not shown), or additional exhaust gas purification components such as a particulate filter.

Figure 2B:
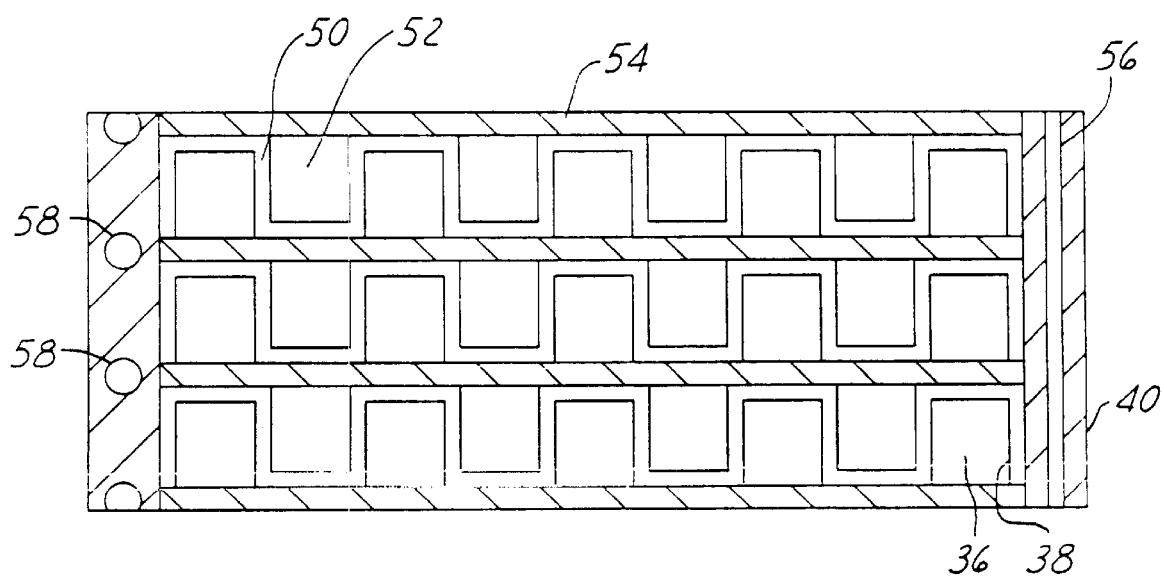

FIG. 2A shows a cross-sectional view of part of a $NO_x$ conversion catalyst unit 34 of FIG. 1 along lines 2—2. FIG. 2B shows a detail of a portion of FIG. 2A. Referring now to FIGS. 2A and 2B, a $NO_x$ conversion catalyst unit 34 is shown including a catalyst section 36 including a catalytic layer 38 as well as a heat exchanger 40.

As shown in FIG. 2B, a substrate wall 50 creates a plurality of channels 52 through which the exhaust gas flows. The substrate wall 50 is formed of a good heat conducting material such as metal and is washcoated with a high surface area Zeolite material. Substrate wall 50 carries the catalytic layer 38 which carries out the $NO_x$ conversion.

A plurality of heat sinks or fins 54 are included adjacent portions of the substrate wall 50 to transfer heat generated during the $NO_x$ conversion process to the heat exchanger 40. The heat exchanger 40 preferably includes a plurality of fluid flow conduits designated alternatively as vertical conduit 56 or horizontal conduits 58. Air or liquid flowing through the conduits 56, 58 maintain the temperature of the substrate 50 and hence the exhaust gas flowing through the $NO_x$ conversion catalyst unit 34 within a narrow temperature range optimum for $NO_x$ conversion efficiency. For example, in one test, a temperature of 200° C. within a range of 190–210° C. provided near optimum $NO_x$ conversion with the catalyst under consideration. Of course, the more narrow the window about the optimum temperature, the better. Fluctuations, however, will occur due to tradeoffs between the temperature regulating devices and engine operating conditions. Specifically, the size and complexity of the heat exchangers may outweigh the additional benefits of more closely regulating the exhaust gas temperature. In addition, the optimum temperature will depend on the catalyst composition.

FIG. 3 shows an isometric view of an alternative embodiment of a catalyst section of a $NO_x$ conversion catalyst unit of FIG. 1. The catalyst section 60 includes an upstream catalyst layer 62 and a downstream heat exchanger 64. The heat exchanger 64 further includes a fluid conduit 66 having an inlet 68 and outlet 70 for maintaining the temperature of the catalyst layer 62 within its optimal range for $NO_x$ conversion efficiency. A fluid such as glycol under pressure having a heating point of 197° C. at 1.0 atm, can be circulated through the conduit 66.

Catalyst section 60 can be conveniently manufactured by applying the catalyst and washcoat to only one-half of the structure forming the catalyst section 60. No catalyst would be present on the rear section of each catalyst section 60. As a result, no exothermic reductant reaction would be created in the heat exchange portion 64 of the catalyst section. In addition, the -thermal mass would aid to dampen exhaust gas temperature fluctuations. The addition of heat sink fins (not shown) would further dampen exhaust gas temperature fluctuations, and aid to maintain the catalyst layer 62 within a desired temperature range. The cross-flow heat exchanger 64 of the rear portion of the catalyst section 60 could also consist, for example, of a rectangular flow section similar to those found in automotive radiators with a fluid coil (liquid or gas) to aid in the heat transfer.

Figure 4:
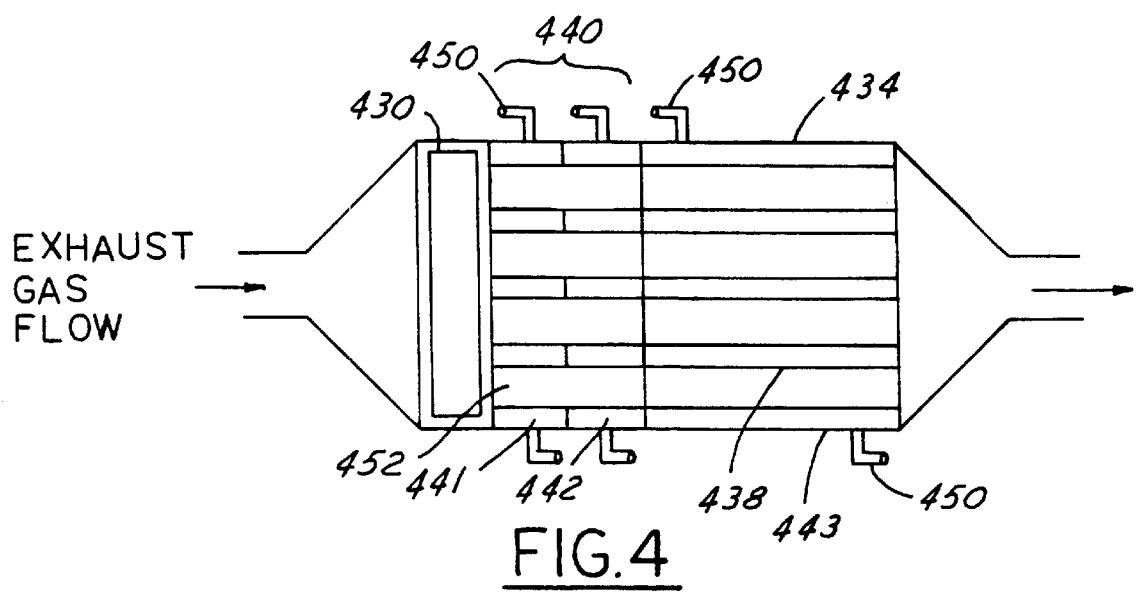
FIG. 4 is a schematic view of another embodiment of a $NO_x$ conversion catalyst unit according to the present invention.

FIG. 4 is a schematic view of another embodiment of a $NO_x$ conversion catalyst unit 434 according to the present invention. Referring to FIG. 4, the heater and thermal mass unit have been combined as a single unit 430. The $NO_x$ conversion catalyst unit 434 includes a front heat exchanger portion 440 and a rear catalyst section 438. The combined structure is formed similar to that described above with reference to FIG. 2B. Accordingly, the catalyst section 438 includes a washcoat and catalyst carried on a substrate which is coupled to a heat exchanger 443. In addition, because there is only one $NO_x$ conversion catalyst unit 434 in the exhaust gas purification system of FIG. 4, one or more additional heat exchangers 441, 442 are included upstream of the catalyst section 438 having corresponding fluid conduits 450. The fluid conduits preferably channel cooling air or fluid in alternating directions as it flows from inlet to outlet.

The first heat exchanger 441 includes a fluid conduit (not shown) carrying a cooling fluid which acts to cool the exhaust gas flowing through the substrate channel 452. The operating temperature of the first heat exchanger 441 depends upon the transient or steady state engine operation and load conditions. The second heat exchanger 442 acts to further cool or maintain the temperature for $NO_x$ conversion within the catalyst. The third heat exchange 443 likewise maintains the bed temperature of the catalyst near the optimum temperature for $NO_x$ conversion and cools the exhaust gas flowing through the gas channel 452.

The advantage of the single unit embodiment of FIG. 4 is simplified construction and fewer components as compared to the multiple catalyst system of FIG. 1.

From the foregoing it will be seen that there has been brought to the art a new and improved exhaust gas purification system having increased $NO_x$ conversion efficiency. While the invention has been described in connection with one or more embodiments, it will be understood that the invention is not limited to those embodiments. On the contrary, the invention covers all alternatives, modifications, and equivalents, as may be included within the spirit and scope of the appended claims.

What is claimed is:

1. An exhaust gas purification system for a lean burn engine comprising:
    a thermal mass unit having an associated thermal inertia to maintain said exhaust gas temperature substantially constant during transient engine operation;
    a heater proximate said thermal mass unit; and
    a $NO_x$ conversion catalyst unit downstream of said thermal mass unit and said heater, said $NO_x$ conversion catalyst unit including at least one catalyst section, wherein each of said catalyst sections comprises a catalytic layer for converting $NO_x$ coupled to a heat exchanger for maintaining said catalytic layer substantially at a desired temperature and for cooling exhaust gas flowing from said catalytic layer.

2. The exhaust gas purification system of claim 1 comprising a plurality of serially arranged catalyst sections spaced apart from each other.

3. The exhaust gas purification system of claim 1 including at least two $NO_x$ conversion catalyst units serially arranged in the exhaust gas flow.

4. The exhaust gas purification system of claim 3 comprising a plurality of serially arranged catalyst sections spaced apart from each other.

5. The exhaust gas purification system of claim 1 wherein said heat exchangers are fluid-cooled heat exchangers.

6. The exhaust gas purification system of claim 1 further comprising a heater upstream of said $NO_x$ conversion catalyst unit.

7. The exhaust gas purification system of claim 1 further comprising an oxidation catalyst downstream of said $NO_x$ conversion catalyst unit.

8. The exhaust gas purification system of claim 1 wherein said catalytic layer comprises a catalyst carried on a substrate wherein said catalyst comprises one or more materials selected from the group consisting of platinum, palladium, rhodium, and transition metals combined therewith.

9. The exhaust gas purification system of claim 1 where the $NO_x$ conversion catalyst unit includes at least one upstream heat exchanger coupled to the catalyst section.

10. An exhaust gas purification system for a lean burn engine comprising:
    a dual length exhaust pipe including a first path, a second path, and an exhaust valve positioned in said exhaust pipe for regulating the flow of exhaust gas between said first path and said second path;
    a thermal mass unit having an associated thermal inertia to maintain said exhaust gas temperature substantially constant during transient engine operation;
    control logic operative to control said exhaust valve so as to regulate the temperature of the exhaust gas; and
    a $NO_x$ conversion catalyst unit downstream of said thermal mass unit, said $NO_x$ conversion catalyst unit including at least one serially arranged catalyst section, wherein each of said catalyst sections comprises a catalytic layer for converting $NO_x$ coupled to a heat exchanger for maintaining said catalytic layer substantially at a desired temperature and for cooling exhaust gas flowing from said catalytic layer.

11. The exhaust gas purification system of claim 10 wherein said second path includes a heat exchange unit for regulating the exhaust gas temperature flowing into said $NO_x$ conversion catalyst unit.

12. The exhaust gas purification system of claim 10 comprising a plurality of serially arranged catalyst sections spaced apart from each other.

13. The exhaust gas purification system of claim 10 including at least two $NO_x$ conversion catalyst units serially arranged in the exhaust gas flow.

14. The exhaust gas purification system of claim 10 further comprising a heater upstream of said $NO_x$ conversion catalyst unit.

15. The exhaust gas purification system of claim 10 further comprising an oxidation catalyst downstream of said $NO_x$ conversion catalyst unit.

16. The exhaust gas purification system of claim 10 wherein said catalytic layer comprises a catalyst carried on a substrate wherein said catalyst comprises one or more materials selected from the group consisting of platinum, palladium, rhodium, and transition metals combined therewith.

17. The exhaust gas purification system of claim 10 wherein the $NO_x$ conversion catalyst unit includes at least one upstream heat exchanger coupled to the catalyst section.

18. A method for controlling the temperature in an exhaust system of an internal combustion engine comprising:
    damping the temperature fluctuation of the exhaust gas flow with a thermal mass unit having an associated thermal inertia to maintain said exhaust gas temperature substantially constant during transient engine operation;
    providing a $NO_x$ conversion catalyst unit downstream of said thermal mass unit, said $NO_x$ conversion catalyst unit including at least one serially arranged catalyst sections wherein each of said catalyst sections comprises a catalytic layer coupled to a fluid-cooled heat exchanger;
    providing a heater upstream of said $NO_x$ conversion catalyst unit;
    selectively activating said heater during engine cold-start; and
    moderating the fluid flow of said heat exchanger to maintain said catalytic layer substantially at a desired temperature and to cool exhaust gas flowing from said catalytic layer.

19. The method of claim 18 further comprising the steps of:
    providing a dual length exhaust pipe including an exhaust valve, a first path, and second path said dual length exhaust pipe being upstream of said thermal mass unit; and
    controlling said exhaust valve to selectively direct exhaust gas flow through said second path.

* * * * *